United States Patent
Kronburger et al.

(10) Patent No.: US 12,283,907 B2
(45) Date of Patent: Apr. 22, 2025

(54) CONTROL ELECTRONICS, ELECTROMECHANICAL ACTUATOR, AIRCRAFT AND METHOD FOR DAMPING THE MOVEMENT OF AN ELECTROMECHANICAL ACTUATOR

(71) Applicant: Liebherr-Aerospace Lindenberg GmbH, Lindenberg (DE)

(72) Inventors: Frank Kronburger, Lindenberg (DE); Julian Kinzelmann, Hergensweiler (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 90 days.

(21) Appl. No.: 18/130,139

(22) Filed: Apr. 3, 2023

(65) Prior Publication Data

US 2023/0318513 A1    Oct. 5, 2023

(30) Foreign Application Priority Data

Apr. 5, 2022   (DE) .................. 10 2022 108 181.8

(51) Int. Cl.
| | |
|---|---|
| *H02P 23/04* | (2006.01) |
| *B64C 13/50* | (2006.01) |
| *H02P 3/22* | (2006.01) |
| *H02P 29/04* | (2006.01) |

(52) U.S. Cl.
CPC .............. *H02P 29/04* (2013.01); *B64C 13/50* (2013.01)

(58) Field of Classification Search
CPC ...... H02P 29/025; H02P 29/04; H02P 29/028; H02P 23/04; H02P 3/22; B64C 13/50

USPC .......................................................... 318/445
See application file for complete search history.

(56) References Cited

U.S. PATENT DOCUMENTS

| | | | | |
|---|---|---|---|---|
| 6,443,399 | B1* | 9/2002 | Yount ................... | G05D 1/0077 244/221 |
| 8,068,943 | B2* | 11/2011 | Manfred .............. | G05D 1/0077 244/76 R |
| 8,104,720 | B2* | 1/2012 | Hirvonen ................ | B64C 13/10 244/221 |
| 2012/0032031 | A1* | 2/2012 | Grohmann ............. | B64C 13/42 244/221 |
| 2012/0038302 | A1* | 2/2012 | Casimir .............. | H02M 7/5388 318/400.27 |
| 2013/0082149 | A1* | 4/2013 | Boucaud ................... | H02J 4/00 307/41 |

(Continued)

FOREIGN PATENT DOCUMENTS

| | | |
|---|---|---|
| EP | 3835616 A1 | 6/2021 |
| EP | 3972114 A1 | 3/2022 |

(Continued)

*Primary Examiner* — Gabriel Agared
(74) *Attorney, Agent, or Firm* — Dilworth & Barrese, LLP.

(57) ABSTRACT

The present invention relates to control electronics, preferably for an electromechanical actuator, preferably for use in a primary flight control system of an aircraft, wherein the control electronics can connect or connects an electric motor, preferably of the electromechanical actuator, to an electrical or electronic load and/or wherein the control electronics can deactivate or deactivates a DC/DC converter supplying electrical power to the electric motor, and to an electromechanical actuator and to a method for damping the movement of an electromechanical actuator.

1 Claim, 1 Drawing Sheet

(56) References Cited

U.S. PATENT DOCUMENTS

| | | |
|---|---|---|
| 2014/0152201 A1 | 6/2014 | Shriver |
| 2018/0297432 A1 | 10/2018 | Giovanardi et al. |
| 2020/0290729 A1 | 9/2020 | Charafeddine et al. |
| 2022/0094297 A1* | 3/2022 | Lacaux .................. B60L 15/20 |
| 2022/0200503 A1* | 6/2022 | Popek ..................... H02P 27/06 |

FOREIGN PATENT DOCUMENTS

| | | |
|---|---|---|
| EP | 4020789 A1 | 6/2022 |
| FR | 2948630 A1 | 2/2011 |
| FR | 2952448 A1 | 5/2011 |
| WO | 2010/033101 A1 | 3/2010 |

\* cited by examiner

CONTROL ELECTRONICS, ELECTROMECHANICAL ACTUATOR, AIRCRAFT AND METHOD FOR DAMPING THE MOVEMENT OF AN ELECTROMECHANICAL ACTUATOR

BACKGROUND OF THE INVENTION

The present invention relates to control electronics, preferably for an electromechanical actuator, preferably for use in a primary flight control system of an aircraft, and to an electromechanical actuator, and to an aircraft and a method for damping the movement of an electromechanical actuator.

In prior art aircraft, primary flight control actuators are used exclusively by means of hydraulic actuators controlled or powered either directly or by electrohydraulic actuator (EHA) technologies.

These hydraulic actuators of the primary flight controls also dampen hydraulically, for example, to prevent free flutter or unintended movement of flight control surfaces.

The damping function is implemented here, for example, by means of a hydraulic bypass, as described, for example, in U.S. Pat. No. 10,465,832 B2.

In electromechanical actuators, there are different approaches to enable this type of damping. One approach is to short-circuit the motor phases by means of a relay or electronic switch. US 2020/0059172 A1 describes the damping of a motor by short-circuiting the motor phases.

Alternatively, additional damping elements such as eddy current brakes or hydraulic systems are used.

Damping elements, such as eddy current brakes, are widely used in industry. However, these have significant disadvantages for use in aircraft. The use in primary flight control and the resulting temperature and vibration conditions, for example, have a detrimental effect on eddy current brakes.

The realization by means of closing the motor phases is already used in aircraft, but this only works for high-voltage systems.

Short-circuiting by means of relays has the disadvantage of short relay life, especially when used in the primary flight control of an aircraft.

Electromechanical actuators, for example for new generation aircraft, also require a damping function.

Electromechanical actuators in aviation for flight controls require a damping element to limit the running speed of the actuator to an acceptable level in case of malfunction or loss of supply voltage.

SUMMARY OF THE INVENTION

Against this background, the present invention is based on the object of providing a damping function for an electromechanical actuator, preferably for its use in an aircraft.

This object is achieved by the subject-matter having the features herein and method also described herein. Advantageous further developments of the invention are the subject-matter herein.

Accordingly, it is provided in accordance with the invention that the control electronics can connect or connects an electric motor, preferably of the electromechanical actuator, to an electric or electronic load and/or that the control electronics can deactivate or deactivates a DC/DC converter supplying electric power to the electric motor.

It is conceivable that the control electronics can connect or connects the phases of an electric motor to the electrical or electronic load.

In other words, this preferably implements a damping function in an electromechanical actuator for a primary flight control system. For example, an electrical damping architecture is provided for an electromechanical actuator operated at 28 V DC.

In other words, the control electronics and the connected active load in the DC circuit achieve an effect similar to short-circuiting the phases of an electric motor. Preferably, the combination between the DC/DC converter or power supply unit and the control electronics is described by the invention.

In other words, the control electronics can also be referred to as activation electronics.

Preferably, it is provided that the control electronics comprise detection means for detecting the counter voltage of the electric motor or that the control electronics are supplied with the counter voltage of the electric motor.

It is conceivable that only the counter voltage of the electric motor or no voltage is applied to the control electronics. Preferably, voltage is to be understood as DC voltage.

It is thus conceivable that the control electronics is activated when the electric motor generates a counter voltage through its externally induced rotation, by means of which the control electronics is supplied and thus activated.

It is also conceivable that the control electronics is deactivated when the electric motor is not subject to externally induced rotation and thus does not generate a counter voltage by means of which the control electronics is supplied. It is conceivable that the control electronics can interrupt or interrupts the connection of the electric motor to the electrical or electronic load and/or that the control electronics can activate or activate the DC/DC converter that supplies the electric motor with electrical power when the electric motor is not subject to externally induced rotation.

In an advantageous embodiment, it is provided that the control electronics is activated or can be activated in the event of an electrical failure or in the event of loss of a supply voltage. The damping function is thus preferably to be available in the event of an internal electrical failure or loss of the supply voltage.

The electrical or electronic failure can preferably occur in the entire aircraft, or can be limited to the electromechanical actuator. Likewise, it is conceivable that the supply voltage refers to any supply voltage in the aircraft or only to the supply voltage of the electromechanical actuator.

It is conceivable that the control electronics is part of a low-voltage system. Preferably, the damping is realized for electromechanical actuators, which can be used for low-voltage systems.

Low voltage, for example, refers to the range up to 1500 volts DC.

The control electronics can be part of an engine control system or be independent of it.

The invention also relates to an electromechanical actuator, preferably for use in a primary flight control system of an aircraft having control electronics according to the invention.

Furthermore, the present invention relates to an aircraft, in particular to an aircraft with such an electromechanical actuator or with the control electronics according to the invention.

The invention also relates to a method for damping the movement of an electromechanical actuator according to the invention with an electric motor, preferably for use in a primary flight control system of an aircraft, comprising the following steps:

activating of the control electronics by an electrical failure and/or by loss of a supply voltage and/or by supplying the control electronics with a counter voltage generated by the electric motor;

switching the phases of the electric motor to an electrical or electronic load and/or deactivating a DC/DC converter that supplies electrical power to the electric motor.

An advantage of the invention lies with the realization of an electronic damping with the existing electromechanical components and an additional power supply unit or a DC/DC converter, which can be used in the application of electromechanical actuators for flight control.

Another advantage lies with the use of existing electromechanical components to implement damping in combination with a power supply unit or a DC/DC converter for electromechanical actuators operated with a 28 V on-board supply.

At this point it is noted that the term "one" does not necessarily refer to exactly one of the elements, although this is a possible version, but can also denote a plural of the elements. Likewise, the use of the plural also includes the presence of the element in question in the singular and, conversely, the singular also includes several of the elements in question. Furthermore, all of the features of the invention described herein may be claimed in any combination or in isolation from one another.

BRIEF DESCRIPTION OF THE DRAWINGS

Further advantages, features and effects of the present invention will be apparent from the following description of preferred embodiments with reference to the figures, in which the same or similar components are designated by the same reference characters. The Figures show in.

DESCRIPTION OF THE PREFERRED EMBODIMENTS

Figure 1:
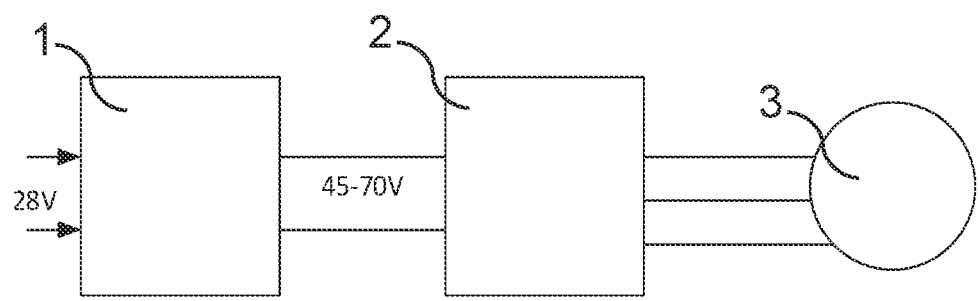
FIG. 1: an embodiment of a circuit with control electronics according to the invention.

FIG. 1 shows components with which a solution to the damping requirement can be implemented.

FIG. 1 shows a DC/DC converter 1 supplied with a DC voltage of 28 V, for example from the on-board power supply of an aircraft, which supplies a motor controller 2 with a DC voltage of 45 to 70 V. The DC/DC converter 1 thus functions as a power supply unit.

This increased voltage of 45 to 70 V allows the electric motor 3 to be dimensioned with increased counter voltage values.

Preferably, a control electronics according to the invention is integrated in the motor controller 2.

The motor controller 2 is connected to the preferably three phases of an electric motor 3 and controls the electric motor.

The control electronics present in the motor controller 2 switches the electric motor 3 to an electric load when the electric motor generates a certain counter voltage.

In normal operation, the DC/DC converter 1 or the power supply unit supplies the motor control electronics or the motor controller 2 of the drive or the electric motor 3. However, in the event of a failure or loss of supply voltage, damping should be activated.

The control electronics preferably requires a minimum voltage to become operative. Due to the modified design, the electric motor 3 generates this minimum voltage at already low speeds.

Figure 2:
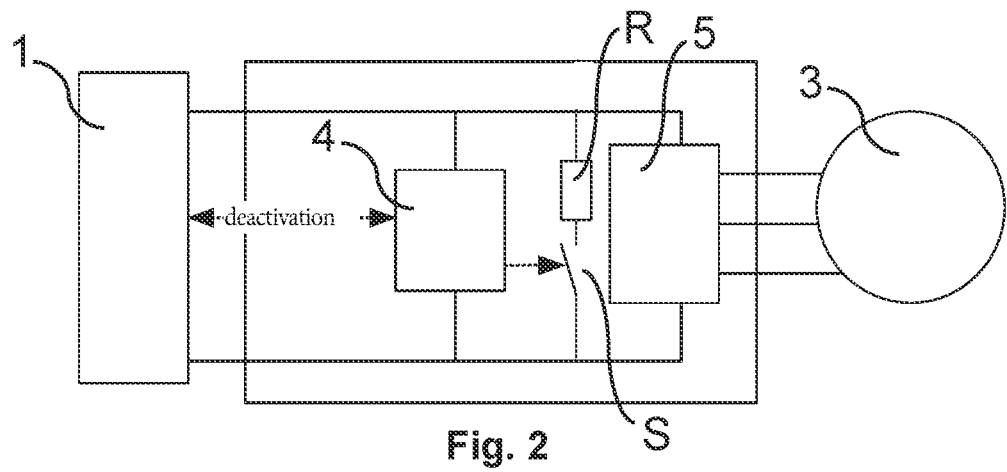
FIG. 2: a further embodiment of a circuit with control electronics according to the invention.

FIG. 2 shows a possible architectural concept of a circuit with control electronics according to the invention.

FIG. 2 shows a DC/DC converter 1 electrically connected to a control electronics 4 and a power amplifier 5.

The power amplifier 5 is connected to the three phases of the electric motor 3.

In the event of a failure, the control electronics 4 deactivates the DC/DC converter 1 and connects the electronic load R to the power amplifier 5 through the switch S.

Activated by the minimum speed of the electric motor 3, the control electronics 4 switches the motor phases or the power amplifier 5 to an electronic load R and thus ensures the required counter-torque. Preferably, a disconnection from the on-board power supply is also implemented by deactivating the DC/DC converter 1.

The invention claimed is:
1. A control electronics system, comprising
a DC/DC converter (1),
control electronics (4) coupled to the DC/DC converter (1),
a power amplifier (5) coupled to the control electronics (4),
an electric motor (3) having three phases coupled to the power amplifier (5),
an electronic load (R), and
a switch(S) arranged to connect the electronic load (R) to the power amplifier (5), wherein
the control electronics (4) is configured to deactivate the DC/DC converter (1) in event of power failure and connect the electronic load (R) to the power amplifier (5) through the switch(S), ensuring required counter-torque.

* * * * *